No. 783,760. PATENTED FEB. 28, 1905.
C. SCHAKL.
FRUIT PICKER.
APPLICATION FILED JULY 31, 1902.
2 SHEETS—SHEET 1.
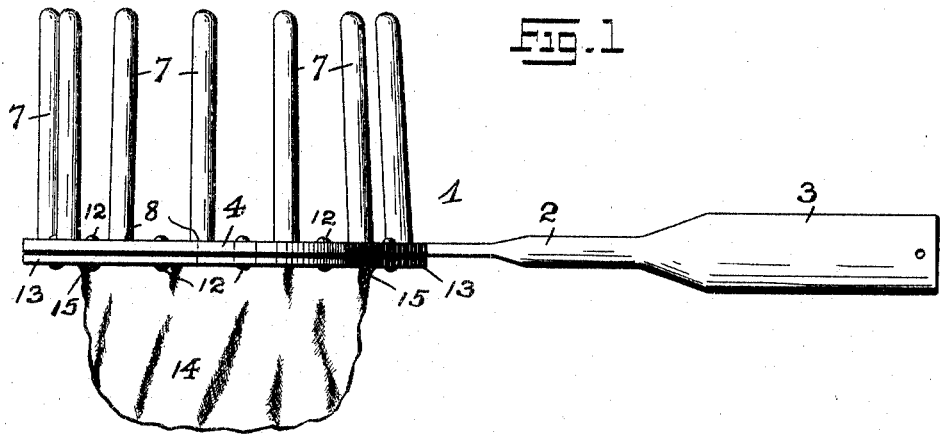
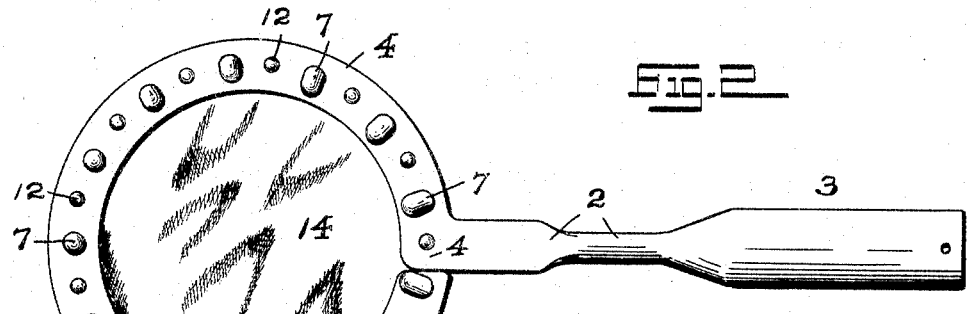
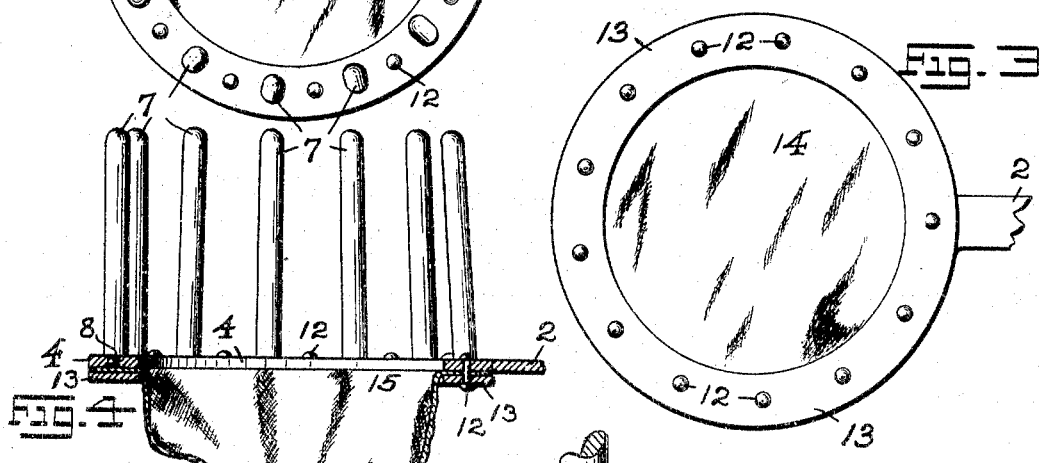
WITNESSES:
Geo. A. Richards
Geo. Douglass
INVENTOR:
Charles Schakl
BY
Fred'k C. Fraentzel
ATTORNEY

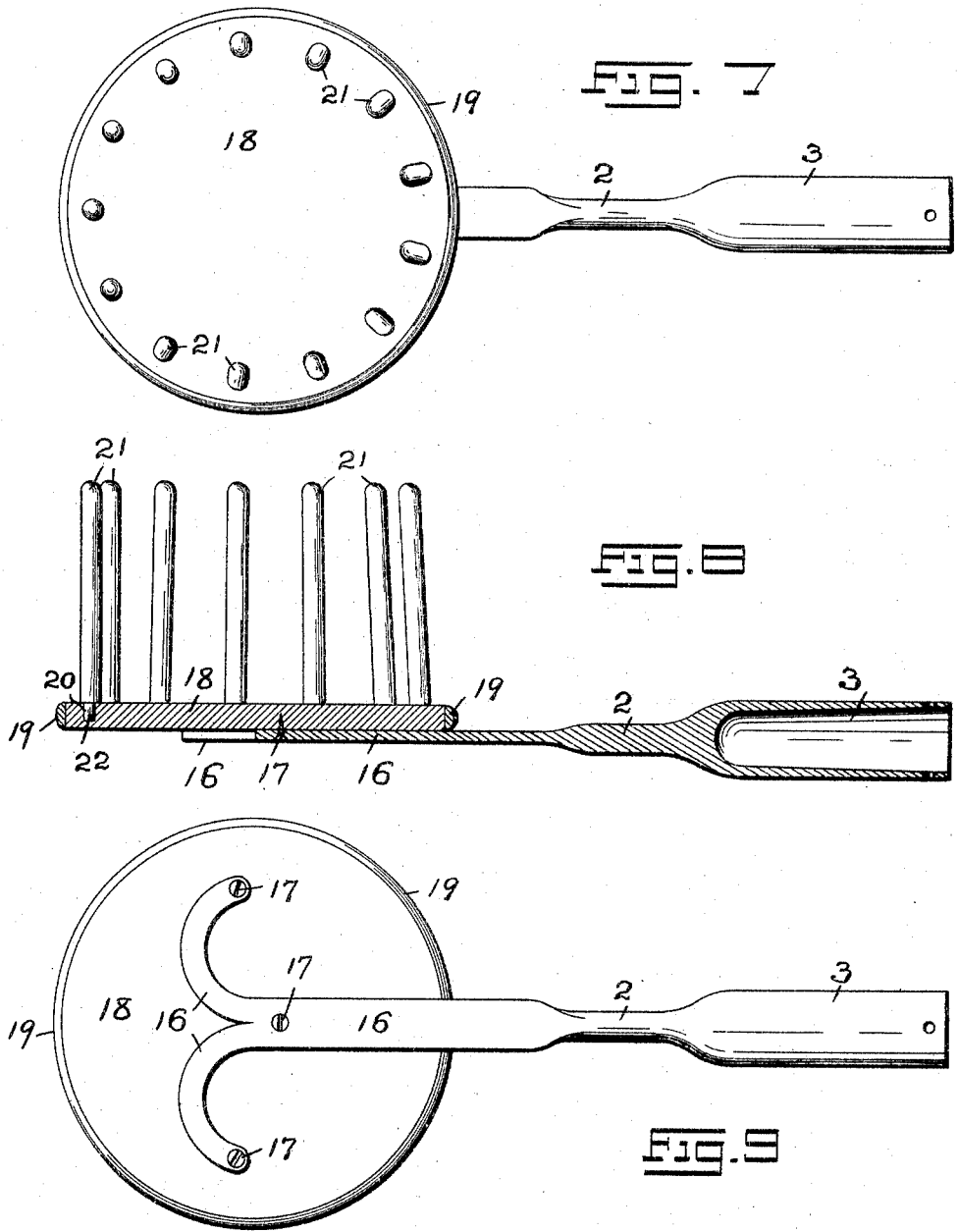

No. 783,760.                                    Patented February 28, 1905.

UNITED STATES PATENT OFFICE.

CHARLES SCHAKL, OF CALDWELL, NEW JERSEY.

FRUIT-PICKER.

SPECIFICATION forming part of Letters Patent No. 783,760, dated February 28, 1905.

Application filed July 31, 1902. Serial No. 117,790.

*To all whom it may concern:*

Be it known that I, CHARLES SCHAKL, a citizen of the United States, residing at Caldwell, in the county of Essex and State of New Jersey, have invented certain new and useful Improvements in Fruit-Pickers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference generally to improvements in fruit-pickers; and the invention has for its principal objects to provide a neat and simply-constructed device of the character hereinafter set forth which can be easily manipulated for the purpose of gathering fruit from trees.

The invention therefore consists in the novel construction of fruit-picker hereinafter more fully set forth; and the invention consists, furthermore, in the various novel arrangements and combinations of parts, all of which will be described in detail in the following specification and then finally embodied in the clauses of the claim which form a part of the said specification.

The invention is clearly illustrated in the accompanying drawings, in which—

Figure 1 is a side elevation, and Fig. 2 is a top or plan view, of the implement for picking or gathering fruit from trees. Fig. 3 is a bottom view of the gathering portion of the said device, and Fig. 4 is a vertical cross-section of the device. Figs. 5 and 6 are detail views of two forms of tines to be used with the device. Fig. 7 is a plan view of a modified form of fruit-gathering implement, but still embodying the features of my present invention. Fig. 8 is a longitudinal vertical section of the same, and Fig. 9 is a bottom view of the device.

Similar characters of reference are employed in all of the said hereinabove-described views to indicate corresponding parts.

In the said drawings the reference character 1 indicates the complete fruit-picking implement, the same comprising a suitable shank 2, having a socket end or receiving portion 3 for the reception of an ordinary handle. The forward end portion of the said shank 2 is made so as to provide a flat ring-shaped body 4, provided with suitably-disposed screw-threaded holes 5, as indicated in Fig. 5, or with the plain cylindrical holes 6. (Represented in Fig. 6.) Extending in an upward direction from the upper surface of the flat ring-shaped body 4 are a number of tines 7, each tine being made with a shoulder 8 and either a screw-threaded shank 9, as indicated in Fig. 5, for securing the lower end of the tine in the screw-hole 5, or with a plain cylindrical shank 10, which is passed through the hole 6 of the tine, (represented in Fig. 6,) and then riveted over to form the holding-head 11, as shown. The said tines 7 are preferably set so that they will be arranged in properly-inclining positions to more readily hold the fruit in the gathering-receptacle while picking the fruit. The said ring-shaped body 4 is also provided with other suitably-disposed holes for the reception of rivets or pins 12 to attach and secure against the lower surface of said ring-shaped body 4, by means of a flat ring 13 or any other suitable holding device the mouth 15 of a flexible bag 14, as clearly illustrated in the several figures of the drawings.

In the construction of fruit-pickers, (represented in Figs. 7, 8, and 9,) in place of the shank 2, provided with a ring-shaped body 4, the said shank is made with a flattened end portion 16, having perforations for the reception of screws 17 for attaching said end portion 16 to the bottom of a solid disk or plate 18, preferably of wood, being of a circular configuration and preferably bounded by a metal band 19. The said disk or plate 18 is made with circularly-disposed receiving-sockets 20, in which are suitably secured the lower ends 22 of wooden or other tines 21, as clearly illustrated.

From the above description of my invention it will be clearly evident that a very simple and cheap construction of device has been produced which can be easily manipulated, owing to its light weight, and which can be used for picking such fruits as apples, pears, peaches, and by setting the tines closely together the device may be used for the gathering of small fruit, such as plums and cherries.

From an inspection of the several figures of the drawings it will be seen that the majority of the tines 7 incline toward a common center above the said ring-shaped body in a vertical plane extending from a line passing between the center of said ring-shaped body and the central portion of the side opposite the socket 2 of the device, while those tines which are located farthest away from the said socket extend at right angles from the said ring-shaped body.

The main purpose of the above arrangement of the tines is that when in the act of picking fruit the implement is held by the operator in an angular position, whereby the right-angled tines will assume an inclined relation toward the suspended fruit to more readily strip the fruit from its position upon the branch while pulling the implement in the direction toward the fruit, but the inclined tines remaining sufficiently in an inclined relation that the stripped or loosened fruit will be surely deposited between the tines and will not fall to the ground.

I am aware that some changes may be made in the details of the construction of the device without departing from the scope of my invention. Hence I do not limit my invention to the exact arrangements and combinations of the parts as herein described and as illustrated in the accompanying drawings, nor do I confine myself to the exact details of the construction of the said parts.

Having thus described my invention, what I claim is—

1. The herein-described fruit-picker, consisting, essentially, of a shank having a socket end for the reception of a handle, a flat and ring-shaped body connected with the said shank and forming a part of the same, said ring-shaped body being provided with perforations, a flat ring beneath said ring-shaped body also provided with perforations, a flexible bag beneath said ring, said bag having its marginal portion which surrounds the mouth of the bag arranged between said ring-shaped body and said ring, rivets in the perforations of said ring-shaped body and said ring for securing the same and the mouth of the bag together, the said ring-shaped body being provided with other perforations, and tines secured in said perforations and extending in upward directions, some of said tines inclining toward a common center above said ring-shaped body in a vertical plane extending from a line passing through the center of said ring-shaped body and the central portion of the side opposite the socket of the device, and other tines on said ring-shaped body extending upwardly at right angles to said ring-shaped body, the said tines which extend at right angles from said ring-shaped body being located farthest away from the socket, substantially as and for the purposes set forth.

2. A fruit-picker comprising a main and ring-shaped body, a socket end on said body, a handle secured in said socket end, and tines connected with said body, said tines extending in upward directions, and some of said tines inclining toward a common center above said ring-shaped body in a vertical plane extending from a line passing through the center of said ring-shaped body and the central portion of the side opposite the socket of the device, and other tines in said ring-shaped body extending upwardly at right angles to said ring-shaped body, the said tines which extend at right angles from said ring-shaped body being located farthest away from the socket, substantially as and for the purposes set forth.

In testimony that I claim the invention set forth above I have hereunto set my hand this 30th day of July, 1902.

CHARLES SCHAKL.

Witnesses:
    FREDK. C. FRAENTZEL,
    GEO. D. RICHARDS.